United States Patent [19]
Kaneko et al.

[11] Patent Number: 5,959,051
[45] Date of Patent: Sep. 28, 1999

[54] PROCESS FOR PREPARING VINYLPHENOL POLYMERS AND STABILIZED COMPOSITIONS OF VINYLPHENOL-CONTAINING POLYMERIZATION RAW MATERIAL

[75] Inventors: Masao Kaneko, Saitama-ken; Takeshi Noguchi; Nobuyuki Oka, both of Chiba-ken, all of Japan

[73] Assignee: Maruzen Petrochemical Co., Ltd., Tokyo, Japan

[21] Appl. No.: 09/226,472

[22] Filed: Jan. 7, 1999

Related U.S. Application Data

[63] Continuation-in-part of application No. 08/959,135, Oct. 28, 1997, abandoned.

[30] Foreign Application Priority Data

Mar. 11, 1997 [JP] Japan ........................................ 9-74405

[51] Int. Cl.$^6$ ........................................................ C08F 2/14
[52] U.S. Cl. ............................................ 526/212; 526/313
[58] Field of Search ........................................ 526/212, 313

[56] References Cited

U.S. PATENT DOCUMENTS 4,517,349  5/1985  Fujiwara et al. ........................ 526/212

FOREIGN PATENT DOCUMENTS 63-130604  6/1988  Japan ...................................... 526/212

OTHER PUBLICATIONS

Japanese Patent Publication No. Sho 51(1976)—29137.
R.H. Still et al (Journal of Applied Polymer Science, vol. 21, 1199–1213 1977).
Japanese Patent Application Laid–open No. Sho 53(1978)—13694.
Japanese Patent Application Laid–open No. Sho 61(1986)—291606.
Japanese Patent Application Laid–open No. Sho 63(1988)—130604.
Japanese Patent Application Laid–open No. Sho 51(1976)—96882.

*Primary Examiner*—Bernard Lipman
*Assistant Examiner*—N. Sarofin
*Attorney, Agent, or Firm*—Melvin I. Stoltz

[57] ABSTRACT

Vinylphenol polymers are useful materials having many applications, vinylphenol polymers possessing an appropriate molecular weight corresponding to each of the applications are desired. However, it is very difficult to control the molecular weight of vinylphenol polymers, because vinylphenol monomer exhibits a very high reaction rate in the presence of a radical initiator, and it is very difficult to obtain vinylphenol polymers having molecular weight of from eight thousand to one hundred thousand. Further, vinylphenol monomer is very difficult to store, because it is rapidly polymerized even at room temperature. A simple process for preparing vinylphenol polymers having the molecular weight range mentioned above by simply adding methanol to the polymerization system is disclosed. A stabilized composition of vinylphenol suitable for use to prepare vinylphenol polymers, comprising vinylphenol-containing polymerization raw material and methanol as the indispensable constituents is also disclosed.

11 Claims, No Drawings

PROCESS FOR PREPARING VINYLPHENOL POLYMERS AND STABILIZED COMPOSITIONS OF VINYLPHENOL-CONTAINING POLYMERIZATION RAW MATERIAL

RELATED APPLICATIONS

This application is a Continuation-in-Part of U.S. patent application Ser. No. 08/959,135, filed Oct. 28, 1997 ABN entitled PROCESS FOR PREPARING VINYLPHENOL POLYMERS AND STABILIZED COMPOSITIONS OF VINYLPHENOL-CONTAINING POLYMERIZATION RAW MATERIAL.

BACKGROUND OF THE INVENTION

1. Field of the Invention

The present invention relates to a process for preparing a vinylphenol polymer and a stabilized composition of vinylphenol-containing polymerization raw material.

More particularly, the present invention relates to a process for preparing a vinylphenol polymer by polymerizing a vinylphenol-containing polymerization raw material or copolymerizing this raw material with other copolymerizable vinyl compounds by using a radical initiator in the presence of methanol to ensure manufacture of a vinylphenol polymer with a higher molecular weight. The present invention also relates to a stabilized composition of vinylphenol-containing polymerization raw material to which methanol is added as an indispensable component to improve storage stability over an extended period of time. The stabilized composition is particularly suitable for conducting the process.

2. Description of the Prior Art

A vinylphenol homopolymer possesses various types of reactivity and superior heat resistance inherent to a phenol polymer having phenolic hydroxyl groups. Vinylphenol copolymers have additional characteristics which are not possessed by a vinylphenol homopolymer, such as excellent adhesion, water repellency, reactivity derived from comonomers, and are useful as functional polymer materials. Specifically, these vinylphenol polymers or copolymers are used in a wide variety of applications such as a microphotoresist material, a thermosetting resin, a metal surface treating agent, an ion exchange resin, a chelate resin, and various additives. Polymers possessing an appropriate molecular weight corresponding to each of these applications are desired. Generally, the polymers with a molecular weight (which herein means a weight average molecular weight unless otherwise specifically designated) of several thousands or more, specifically from eight thousand to one hundred thousand, are desired in the field of electronics, such as photoresist materials.

However, it is very difficult to control the molecular weight of vinylphenol polymers, because high purity vinylphenol monomer exhibits a very high reaction rate when subjected to homopolymerization of copolymerization with other vinyl compounds using a radical initiator. The reaction rate can be controlled only with difficulty. The reaction sometimes proceeds violently and recklessly. Therefore, several processes for polymerizing vinylphenol monomer while controlling the polymerization reaction have been proposed, such as a process of polymerizing a crude vinylphenol raw material containing phenolic impurities without purification (Japanese Patent Application Laid-open No. Sho 53 (1978)-13694) or a process of copolymerizing vinylphenol and an acrylic monomer or a styrenic monomer in the presence of a phenol compound possessing no unsaturated side chain and water (Japanese Patent Applications Laid-open No. Sho 61 (1986)-291606 and No. Sho 63 (1988)-130604). Although these processes can produce vinylphenol polymers with a close-to-target molecular weight with improved reproducibility of the molecular weight, the results are not always satisfactory. Rather, there are cases where the molecular weight of the polymer decreases due to a decrease in the vinylphenol concentration by dilution of the vinylphenol monomer with other components. Specifically, under the polymerization conditions where the vinylphenol monomer concentration is low, it is difficult to produce a polymer with a high molecular weight since the monomer concentration is low. In addition, because the vinylphenol monomer produces a polymer with a high molecular weight only with difficulty as compared with other common vinyl compounds, producing a high molecular weight polymer is particularly difficult even in the case of copolymerization using a high proportion of vinylphenol to a vinyl compound used as a comonomer.

Japanese Patent Application Laid-open No. Sho 51 (1976)-96882 discloses a process for controlling the molecular weight of a vinylphenol polymer by causing a compound possessing an alcoholic hydroxyl group to be present when vinylphenol is polymerized. However, this process has an object of obtaining a polymer with a molecular weight of from several hundreds to several thousands at most, using the action of the compound having the alcoholic hydroxyl group to reduce the molecular weight of the polymers. In addition, the process disclosed in the reference is concerned with thermal polymerization. According to R. H. Still et al (J. Appl. Polymer Sci., Vol. 21, 1199–1213 (1977)), the thermal polymerization of vinylphenol is a cationic polymerization caused by inter-molecular or intra-molecular transfer of protons. Copolymerizability with acrylic monomers or styrenic monomers is generally inferior according to such cationic polymerization in comparison with radical polymerization. Moreover, the randomness of the resulting copolymers is poor. Thus, the process disclosed in the reference has these basic problems.

In addition to the above, a vinylphenol monomer which is a raw material for preparing a vinylphenol polymer or copolymer is very unstable. A high purity vinylphenol monomer is easily polymerized while stored even at room temperature. The vinylphenol monomer containing such partly polymerized materials is thus inappropriate as a raw material for polymerization or copolymerization as is. Therefore, a high purity vinylphenol monomer must conventionally be stored under refrigeration at a temperature of lower than 5° C., preferably lower than −20° C. Thus, storing the monomer for manufacturing vinylphenol polymer in an industrial scale has been difficult. Japanese Patent Publication No. Sho 51 (1976)-29137 discloses a composition comprising alkenylphenols and at least one selected from the group of alcohol compounds and phenol compounds to stabilize the monomer mixture. The effect of stabilization obtained by the process disclosed in the reference, however, is quite insufficient. As can be seen from the examples given in the reference, the effect only continues for something over ten hours, at most. Thus, instability of the vinylphenol monomer has imposed a significant restriction in the industrial manufacture of vinylphenol polymers.

SUMMARY OF THE INVENTION

An object of the present invention is to provide a process for manufacturing a vinylphenol polymer or vinylphenol copolymer with a molecular weight of from eight thousand to one hundred thousand economically at a high yield with excellent reproducibility, even when wide polymerization conditions are adopted, such as the case where the concentration of the vinylphenol monomers is low or the ratio of vinylphenol monomers contained in the mixture of monomers to be copolymerized is high.

Another object of the present invention is to provide a composition for preparing vinylphenol polymers, i.e., a composition of vinylphenol-containing polymerization raw material, which can be stored for a long period time, even at a relatively high temperature, e.g., room temperature, in large quantities in the industrial scale manufacture of vinylphenol polymers or copolymers.

As a result of extensive studies, we have found that a vinylphenol polymer or copolymer with a molecular weight higher than that of vinylphenol polymers or copolymers conventionally prepared can be easily manufactured with excellent reproducibility and at a high yield by causing methanol to be present in the reaction system.

We have further found that the storage stability of raw materials for vinylphenol polymerization, and especially the storage stability of raw materials for vinylphenol polymerization obtained by various vinylphenol preparing processes can be remarkably improved if methanol is present, that the degree of the stabilization improvement is greater than that achieved by the composition of the above-mentioned Japanese Patent Publication No. Sho 51 (1976)-29137, and that it is possible to produce polymers having a higher molecular weight range than that conventionally obtained.

In a polymerization using a radical initiator, in general, a chain transfer agent is added as a molecular weight regulator. In such a case, the molecular weight of the resulting polymer is decreased. That is to say, almost no molecular weight regulator having the effect to increase the molecular weight of the resulting polymer is known in the art. Thus, the effect of increasing the molecular weight of the resulting polymer by the addition of methanol mentioned above is an unexpectable one.

Thus, the gist of the first invention resides in a process for preparing a vinylphenol polymer or copolymer by polymerizing a vinylphenol-containing polymerization raw material or copolymerizing a vinylphenol-containing polymerization raw material with at least one vinyl compound which is copolymerizable with vinylphenol by using a radical initiator, characterized in that the polymerization or copolymerization is conducted in the presence of methanol, and the gist of the second invention resides in a stabilized composition for preparing vinylphenol polymer or copolymer by using a radical initiator which comprises a vinylphenol-containing polymerization raw material and methanol as the indispensable constituents.

DETAILED DESCRIPTION OF THE INVENTION

According to the process of the present invention, the molecular weight of the vinylphenol polymer or vinylphenol copolymer can be increased to from eight thousand to one hundred thousand by causing methanol to be present in the polymerization reaction system, even when the concentration of the vinylphenol monomers is low or the ratio of vinylphenol monomers contained in the monomer mixture to be copolymerized is high. In contrast, if the polymerization is carried out in a similar reaction system but in the absence of methanol, the molecular weight of the resulting polymer or copolymer is about half that of the polymer manufactured in the presence of methanol, i.e., by the process of the present invention. If the polymerization temperature is lowered or the concentration of the polymerization initiator is reduced in an attempt to obtain a vinylphenol polymer or copolymer with the molecular weight equivalent to that obtainable by the present invention, there will be problems such as decrease in the yield of polymers or copolymers. As stated above, the addition of methanol in the radical polymerization of the present invention has the effect of increasing the molecular weight of the resulting polymer. This is a quite unexpected result in view of the molecular weight reducing effect of the alcoholic hydroxyl group-containing compound in the thermal polymerization described in the Japanese Patent Application Laid-open No. Sho 51 (1976)-96882 aforementioned. It is also to be noted that in the present invention, though methanol acts as if a polymerization inhibitor or polymerization retardor thereby given a stabilization effect to the vinylphenol-containing polymerization raw material, polymer yield can be increased by the addition of methanol.

The "vinylphenol-containing polymerization raw material" used in the present invention includes a broad range of compositions, such as vinylphenol monomer, monomer mixtures of vinylphenol isomers, mixtures containing these monomers or monomer mixtures, and reaction products such as unpurified products obtained in various processes for manufacturing vinylphenol. More particularly, vinylphenol monomer used in the present invention may be an o-isomer, m-isomer, or p-isomer, or mixtures of these isomers. Products of vinylphenol manufactured by various processes falls within the definition of the vinylphenol-containing polymerization raw material. Specific examples of such vinylphenol manufacturing processes include a process obtaining vinylphenol from phenol via acetoxyphenyl methyl carbinol, a process comprising decarboxylation of hydroxycinnamic acid, a process comprising decomposition of bisphenol ethane, and a process comprising dehydrogenation of ethylphenol. According to some of these processes for manufacturing vinylphenol, the product contains unreacted raw materials, a diluent used in the reaction, and, as side-products of the reaction, either phenolic compounds or a mixture of phenolic compounds and water. These crude reaction products obtained from vinylphenol preparation processes may be used for the manufacture of vinylphenol polymer, as is, without separating such phenolic compounds and water from the crude products. Specifically, crude reaction products containing side-products, such as a reaction product including phenolic compounds and water, or a partially purified material obtained by the partial purification of such a reaction product, are more desirable as a vinylphenol-containing polymerization raw material in view of both the low cost and appropriate properties as a raw material for polymerization of vinylphenol. A crude reaction product or a partially purified reaction product obtained by a dehydrogenation reaction of ethylphenol is the most preferable vinylphenol-containing polymerization raw material to be used in the present invention.

Various radically polymerizable vinyl monomers can be used as vinyl compounds for copolymerizing with vinylphenol in the present invention. Acrylic monomers and styrenic monomers are particularly desirable. As acrylic monomers, acrylic acid, methacrylic acid, esters and am ides of these, acrylonitrile, methacrylonitrile, and the like can be given. As examples of styrenic monomers, styrene, vinyltoluene, bromostyrene, chlorostyrene, and the like can be given.

Specific examples of acrylic monomers include acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, stearyl acrylate, tetrahydrofurfuryl acrylate, cyclohexyl acrylate, benzyl acrylate, 2-hydroxyethyl acrylate, 2-hydroxypropyl acrylate, 2-methoxyethyl acrylate, 2-ethoxyethyl acrylate, 2-butoxyethyl acrylate, 2-phenoxyethyl acrylate, ethoxydiethylene glycol acrylate, phenoxydiethylene glycol acrylate, dicyclopentenyl acrylate, dicyclopentenyloxyethyl acrylate, 1-methoxycyclododecadienyl acrylate, 2,6-dibromo-4-t-butylphenyl acrylate, trifluoroethyl acrylate, tetrafluoropropyl acrylate, octafluoropentyl acrylate, heptadecafluorodecyl acrylate, and isobornyl acrylate; esters of methacrylic acid such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, n-dodecyl methacrylate, n-octadecyl methacrylate, tetrahydrofurfuryl methacrylate, cyclohexyl methacrylate, benzyl methacrylate, 2-hydroxyethyl methacrylate, 2-hydroxypropyl methacrylate, polyethylene glycol methacrylate, polypropylene glycol methacrylate, glycerol methacrylate, methoxypolyethylene glycol methacrylate, 3-chloro-2-hydroxypropyl methacrylate, dimethylaminoethyl methacrylate, diethylaminoethyl methacrylate, 3-trimethoxysilylpropyl methacrylate, 2-(diphenylphosphoxy) ethyl methacrylate, 3-chloro-(2-acidphosphoxy) propyl methacrylate, trifluoroethyl methacrylate, tetrafluoropropyl methacrylate, octafluoropentyl methacrylate, heptadecafluorodecyl methacrylate, and isobornyl methacrylate; polyfunctional acrylic acid esters such as 1,4-butanediol diacrylate, dimethylol tricyclodecane diacrylate, pentaerythritol triacrylate, and tris (acryloyloxyethyl) phosphate; polyfunctional methacrylic acid esters such as ethylene glycol dimethacrylate and tris(methacryloyloxyethyl) isocyanurate; and amides such as acrylamide and methacryl amide. These vinyl compounds may be used individually for binary copolymerization with vinylphenol, or two or more of these unsaturated compounds may be used in combination to effect multi-component copolymerization with vinylphenol.

The ratio of vinylphenol and other vinyl compounds used in the copolymerization is not particularly limited, and can be suitably selected according to the ratio of composition, i.e., the ratio of vinylphenol unit and vinyl compound unit, desired for the target copolymer, copolymerization reactivity ratio of vinylphenol and the vinyl compound used, and the like.

In the case where the polymerization is carried out in the presence of a phenolic compound as mentioned above, non-polymerizable phenolic compounds such as, for example, phenol, cresol, xylenol, ethylphenol, propylphenol, and butyphenol, are preferred. A preferred amount of these non-polymerizable phenolic compounds in the vinylphenol-containing polymerization raw material is usually 3 to 97 wt. %. In the case where these non-polymerizable phenolic compounds are intentionally added, the amount to be added should be such that the resulting proportion falls within this range.

When the effects of water in the present invention is utilized by adding water to the raw material, except for the case where water is already contained in the raw material, the water should preferably be free of impurities such as metal ion, because the resulting polymer may be used for applications in the electronic field. Usually, ion-exchanged water or distilled water is used. The amount of water is usually less than 70 wt. %, and preferably 1 to 30 wt. %, for the total amount of vinylphenol and other vinyl compounds.

With regard to methanol used in the present invention, methanol meeting a common industrial grade is sufficient for use, although it is desirable that the content of impurities such as metal ions in methanol be minimal taking into consideration the fact that the resulting polymer may be used for applications in the electronic field. The amount of methanol used is in the range of 1 to 500 wt. %, preferably 3 to 300 wt. %, and more preferably 3 to 150 wt. %, for the total amount of the raw material excepting methanol in the reaction system. If the amount of methanol is smaller than 1 wt. %, the effect of the present invention may not be sufficiently achieved; if the amount exceeds 500 wt. %, on the other hand, a decrease in the molecular weight of the resulting polymer due to the low monomer concentration in the reaction system is conspicuous.

It is to be noted that the effect of the present invention can only be realized by the use of methanol. No other polar substances, including other alcohols such as ethanol, acetone, tetrahydrofuran, or ethers, can bring about the effect of the present invention. In other words, the effect exhibited by the presence of methanol in the present invention is not identical to the molecular weight increasing effect as can be seen when the polymerization reaction is carried out at a lower temperature resulting from the use of a low boiling point solvent such as ethanol or acetone under atmospheric pressure. The effect also differs from that brought about by the reduction in the concentration of a polymerization initiator by diluting the raw material with a solvent.

Given as examples of radical initiators used in the present invention are benzoyl peroxide, acetyl peroxide, t-butyl peroxide, dibenzoyl disulfide, azobisisobutylonitrile, dimethyl 2,2'-azobisisobutyrate, 2,2'-azobis (4-methoxy-2,4-valeronitrile), and the like. Of these, particularly, preferred are azobisisobutylonitrile and dimethyl 2,2'-azobisisobutyrate. The amount of radical initiators used is in the range of 0.1–10 wt. %, preferably 0.5–5 wt. %, for the total amount of raw materials other than the radical initiator in the reaction system. The total amount of radical initiators may be added at the start of the polymerization reaction, or a part of the radical initiators may be added at the start, with the remaining portion being added intermittently or continuously as the reaction progresses.

A solvent may be used when carrying out the present invention as required. Given as examples of the solvent which can be added are acetone, methyl ethyl ketone, ethyl acetate, butyl acetate, ethanol, propanol, butanol, tetrahydrofuran, dioxane and the like. Aromatic solvents such as benzene, toluene, xylene are also usable. The amount of solvent used can be suitably determined according to the kind and molecular weight of the target polymer, without any specific limitations.

The polymerization reaction temperature in the present invention is 40–150° C., preferably to 60–120° C. If the reaction temperature is lower than 40° C., the yield of the resulting polymer is markedly decreased; if higher than 150° C., not only is it difficult to obtain a polymer having the target high molecular weight, but also there is a tendency for the color of the resulting polymer to be impaired. The reaction time is usually in the range of 10 minutes to 5 hours, preferably from 30 minutes to 3 hours. The polymerization reaction is usually carried out under atmospheric pressure although the reaction under an increased pressure or under a reduced pressure is acceptable. The polymerization operation can be carried out either in a batch process or a continuous process.

After the polymerization reaction, the polymer can be recovered by removing methanol, unreacted monomers, phenol compounds, water, solvents, and the like from the reaction mixture by solvent precipitation, thin film evaporation, or any other optional method. Beside the methods of recovering the target polymer as a solid by completely removing these volatile components, it is possible to leave part of the solvent and recover the polymer in a liquid form according to the application in which the product is used.

The vinylphenol polymer obtained in the present invention is a polymer possessing a linear structure and a weight average molecular weight usually from about eight thousand to one hundred thousand. The polymer structure may be partially cross-linked such as in the case where a polyfunctional monomer is used as a comonomer component. The polymer obtained by the process of the present invention possesses not only the characteristics inherent to a vinylphenol polymer, but also other characteristics such as various types of reactivity, adhesion properties, hydrophilic properties, oleophilic properties, water repellency, corrosion resistance, antistatic properties, thermosetting properties, UV curability, cross-linking properties, flame retardancy, and the like which originate from types of vinyl compounds used together, the composition of monomers, and the molecular weight.

The vinylphenol polymer obtainable by the process of the present invention can be used in various applications such as a microphotoresist, PS plate for printing, etching resist for printed circuit substrates, solder resist, color filter, micro lens, laminated board, mold material, coating material, adhesive, ink, metal surface treating agent, flocculant, antistatic agent, and fiber treating agent.

As mentioned before, the present invention also relates to a composition of vinylphenol-containing polymerization raw material with improved stability. The composition comprises vinylphenol-containing polymerization raw material and methanol as indispensable constituents. The stabilizing effect can be recognized even at a wide ratio of methanol to the vinylphenol-containing polymerization raw material, or to the total amount of vinylphenol-containing polymerization raw material and vinyl compound when vinyl compound is included within the stabilized composition, in the range of 1–500 wt. %, it is preferable to use a ratio in the range of 3–300 wt. %, and it is particularly preferable to use a ratio in the range of 3–150 wt. %. In the case where the vinylphenol-containing polymerization raw material contains non-polymerizable phenol compounds, such as phenol and alkyl substituted phenol compounds, and water, besides vinylphenol, in the stabilized composition, the weight ratio (vinylphenol):(methanol):(phenolic compounds):(water) is preferably 1:0.03–20:0.01–20:0.01–5 and more preferably 1:0.1–10:0.05–5:0.03–2. If a crude reaction product or a partially purified reaction product obtained by a dehydrogenation reaction of ethylphenol is used, the ratio specified above can easily be satisfied by simply adding an appropriate amount of methanol to the crude reaction product or the partially purified reaction product.

When the composition of vinylphenol-containing polymerization raw material is stored, a conventional container or a storage tank not equipped with a refrigerator can be used without any problem. A storage temperature in the range of 0–60° C., preferably 10–50° C., can be employed. However, storage at room temperature is advantageous in practice.

When vinylphenol is homo-polymerized or copolymerized with other components, it is of course possible to use the composition of vinylphenol-containing polymerization raw material with increased stability as is. Thus, not only a vinylphenol monomer, which has conventionally been stored only with difficulty, can be stored for a long period of time in a stable state, but also the stored composition can be directly used as a raw material for the polymerization because the composition contains essentially no polymerized material even after stored for a long term. A series of processes can thus be carried out conveniently and economically.

By the process of the present invention, when vinylphenol is homo-polymerized or copolymerized with other components, a vinylphenol polymer with a molecular weight higher than that of vinylphenol polymers conventionally prepared can be easily manufactured with excellent reproducibility by causing methanol to be present in the reaction system.

When it is intended to store vinylphenol monomers for a long period of time in a stable state, the object can easily be achieved by the use of the stabilized composition of vinylphenol-containing polymerization raw material of the present invention.

By using the composition of vinylphenol-containing polymerization raw material of the present invention directly as polymerization raw material, a process for preparing vinylphenol polymers can thus be carried out conveniently and economically as a series of processes.

DESCRIPTION OF THE PREFERRED EMBODIMENTS

The present invention will now be explained more specifically by way of examples, which shall not be construed as limiting the present invention. In the following examples and comparative examples, percent (%) indicates percent on weight basis (wt. %).

EXAMPLE 1

15 g of methanol was added to and dissolved in a mixture of 54.0 g of a vinylphenol-containing polymerization raw material obtained by dehydrogenation of p-ethylphenol (ingredients: 17 g of p-vinylphenol, 28.6 g of p-ethylphenol, 1.5 g of p-cresol, 0.4 g of phenol, and 6.5 g of water), and 27 g of t-butyl acrylate. To the resulting solution was added 0.50 g of azobisisobutylonitrile (AIBN) as a radical initiator and the mixture was heated for two hours at 100° C. The molar ratio of p-vinylphenol and t-butyl acrylate in the mixture was 33:67. The reaction product was charged into a mixture of toluene and hexane, and the resulting precipitate was dissolved in methanol. The solution obtained was again charged into the mixture of toluene and hexane.

The precipitate produced was collected and dried under a reduced pressure to obtain 38.6 g of a polymer. The yield of the polymer on the total amount of p-vinylphenol and t-butyl acrylate was 87.7%. The molecular weight of the polymer was measured by gel permeation chromatography (GPC) to confirm that the weight average molecular weight (Mw) was 75,500 and the number average molecular weight (Mn) was 33,000. This polymer was analyzed by the $^{13}$C-NMR spectroscopy and IR spectroscopy to identify that the polymer was a copolymer of p-vinylphenol and t-butyl acrylate. From the peak area ratio of $^{13}$C-NMR spectrum, the ratio of p-vinylphenol (m) and t-butyl acrylate (n) in the copolymer was calculated to be m/n=42/58 (molar ratio). This polymer was soluble in water, methanol, acetone and tetrahydrofuran and insoluble in toluene and hexane.

COMPARATIVE EXAMPLE 1

Copolymerization of p-vinylphenol and t-butyl acrylate was carried out under the same conditions as in Example 1, except that the addition of methanol was omitted and the amount of AIBN used was 0.42 g (the same ratio (0.52%) to the amount of other raw materials as in Example 1). The reaction product was processed in the same manner as in Example 1 to obtain 36.4 g of a copolymer at a yield of 82.8%. The molecular weight of the polymer was measured by GPC to find that the weight average molecular weight (Mw) was 39,200 and the number average molecular weight (Mn) was 17,500. This polymer was analyzed by the $^{13}$C-NMR spectroscopy and IR spectroscopy to identify that the polymer was a copolymer of p-vinylphenol and t-butyl acrylate. From the peak area ratio of $^{13}$C-NMR spectrum, the ratio of p-vinylphenol (m) and t-butyl acrylate (n) in the copolymer was calculated to be m/n=41/59 (molar ratio).

EXAMPLE 2

A copolymerization reaction and post-treatments were carried out in the same manner as in Example 1 except that the amount of t-butyl acrylate used was changed to 24 g and the amount of AIBN used was changed to 0.65 g.

The term "post-treatments" used herein means following successive treatments: The polymerization product was charged into a mixture of toluene and hexane, and the resulting precipitate was dissolved in methanol. The solution obtained was again charged into the mixture of toluene and hexane. The precipitate produced was collected and dried under a reduced pressure.

Thus, 33.7 g (yield: 82.1%) of a copolymer was obtained. The copolymer had a weight average molecular weight (Mw) of 40,000.

COMPARATIVE EXAMPLE 2

A copolymerization reaction and post-treatments were carried out in the same manner as in Example 2 except that methanol was not used and the amount of AIBN used was changed to 0.55 g. Thus, 30.2 g (yield: 73.5%) of a copolymer was obtained. The copolymer had a weight average molecular weight (Mw) of 24,100.

EXAMPLE 3

A copolymerization reaction and post-treatments were carried out in the same manner as in Example 1 except that the amount of t-butyl acrylate used was changed to 11 g and the amount of AIBN used was changed to 0.65 g. Thus, 25.2 g (yield: 91.2%) of a copolymer was obtained. The copolymer had a weight average molecular weight (Mw) of 21,300.

COMPARATIVE EXAMPLE 3

A copolymerization reaction and post-treatments were carried out in the same manner as in Example 3 except that methanol was not used and the amount of AIBN used was changed to 0.53 g. Thus, 23.6 g (yield: 85.2%) of a copolymer was obtained. The copolymer had a weight average molecular weight (Mw) of 13,200.

COMPARATIVE EXAMPLE 4

A copolymerization reaction and post-treatments were carried out in the same manner as in Example 3 except that 15 g of ethanol was used instead of methanol. Thus, 23.4 g (yield: 83.7%) of a copolymer was obtained. The copolymer had a weight average molecular weight (Mw) of 14,400.

From the above, it is apparent that when ethanol is used instead of methanol, a copolymer having a lower weight average molecular weight is formed comparing to a copolymer obtainable by the use of methanol. Rather, it can be judged that the addition of ethanol gives substantially no improvement over the result obtained in Comparative Example 3 in which no methanol is used.

COMPARATIVE EXAMPLE 5

A copolymerization reaction and post-treatments were carried out in the same manner as in Examiner 3 except that 15 g of acetone was used instead methanol. Thus 22.1 g (yield: 78.9%) of a copolymer was obtained. The copolymer had a weight average molecular weight (Mw) of 13,500.

From the above, it is apparent that when acetone is used instead of methanol, a copolymer having a lower weight average molecular weight is formed. Rather, it can be judged that the addition of acetone gives substantially no improvement over the result obtained in Comparative Example 3 in which no methanol is used.

EXAMPLES 4–10 AND COMPARATIVE EXAMPLES 6–11

Many experiments shown in Table 1 were carried out by using the vinylphenol-containing polymerization raw material used in Example 1. In the Table, the amount of vinylphenol-containing polymerization raw material used is shown in terms of the amount of p-vinylphenol contained in the polymerization raw material used. In the experiments, the effect of methanol was examined by changing the kinds of comonomers and the amounts of vinylphenol-containing polymerization raw material used. Detailed polymerization conditions used and the results obtained thereby were shown in Table 1. Example 8 and Comparative Example 9 show the results of vinylphenol homopolymerization by using the vinylphenol-containing polymerization raw material as the sole polymerizable material.

TABLE 1a

|  | Ex. 1 | C. Ex. 1 | Ex. 2 | C. Ex. 2 | Ex. 3 | C. Ex. 3 |
|---|---|---|---|---|---|---|
| p-vinylphenol (g) | 17 | 17 | 17 | 17 | 17 | 17 |
| TBA[1] (g) | 27 | 27 | 24 | 24 | 11 | 11 |
| Styrene (g) | — | — | — | — | — | — |
| MMA[2] (g) | — | — | — | — | — | — |
| AIBN[3] |  |  |  |  |  |  |
| (g) | 0.50 | 0.42 | 0.65 | 0.55 | 0.65 | 0.53 |
| (wt. %) | 0.52 | 0.52 | 0.70 | 0.70 | 0.82 | 0.82 |
| Methanol (g) | 15.0 | — | 15.0 | — | 15.0 | — |
| Mw[4] | 75,500 | 39,200 | 40,000 | 24,100 | 21,300 | 13,200 |
| Composition of monomers charged (p-VP mol. %)[5] | 33 | 33 | 43 | 43 | 63 | 63 |
| p-VP content of copolymer formed (p-VP mol. %) | 42 | 41 | 49 | 50 | 61 | 63 |
| Amount of copolymer formed (g) | 38.6 | 36.4 | 33.7 | 30.2 | 25.2 | 23.6 |
| Yield of copolymer (%) | 87.7 | 82.7 | 82.1 | 73.5 | 91.2 | 85.2 |

[1] t-butyl acrylate;
[2] methyl methacrylate
[3] azoisobutyronitrile
[4] weight average molecular weight
[5] (moles of p-VP charged/moles of total monomers charged × 100
C. Ex.: Comparative Example TABLE 1b

|  | C. Ex. 4 | C. Ex. 5 | Ex. 4 | C. Ex. 6 | Ex. 5 | Ex. 6 |
|---|---|---|---|---|---|---|
| p-vinylphenol (g) | 17 | 17 | 17 | 17 | 17 | 17 |
| TBA[1] (g) | 11 | 11 | 24 | 24 | — | — |
| Styrene (g) | — | — | — | — | — | — |
| MMA[2] (g) | — | — | — | — | 9 | 9 |
| AIBN[3] | | | | | | |
| (g) | 0.65 | 0.53 | 1.30 | 1.09 | 0.65 | 0.49 |
| (wt. %) | 0.81 | 0.81 | 1.40 | 1.40 | 0.83 | 0.83 |
| Methanol | (ethanol) | (acetone) | 15.0 | — | 15.0 | 5.0 |
| (g) | 15.0 | 15.0 | | | | |
| Mw[4] | 14,400 | 13,500 | 32,500 | 18,000 | 22,800 | 18,100 |
| Composition of monomers charged (p-VP mol. %)[5] | 60 | 60 | 43 | 43 | 61 | 61 |
| p-VP content of copolymer formed (p-VP mol. %) | 60 | 61 | 45 | 50 | 61 | 59 |
| Amount of copolymer formed (g) | 23.4 | 22.1 | 35.0 | 31.4 | 15.3 | 14.5 |
| Yield of copolymer (%) | 83.7 | 78.9 | 85.4 | 76.6 | 89.8 | 85.1 |

[1] t-butyl acrylate;
[2] methyl methacrylate
[3] azoisobutyronitrile
[4] weight average molecular weight
[5] (moles of p-VP charged/moles of total monomers charged × 100
C. Ex.: Comparative Example TABLE 1c

|  | C. Ex. 7 | Ex. 7 | C. Ex. 8 | Ex. 8 | C. Ex. 9 |
|---|---|---|---|---|---|
| p-vinylphenol (g) | 17 | 11 | 11 | 17 | 17 |
| TBA[1] (g) | — | — | — | — | — |
| Styrene (g) | — | 6 | 6 | — | — |
| MMA[2] (g) | 9 | — | — | — | — |
| AIBN[3] | | | | | |
| (g) | 0.45 | 0.58 | 0.47 | 0.30 | 0.23 |
| (wt. %) | 0.83 | 0.88 | 0.88 | 0.43 | 0.43 |
| Methanol (g) | — | 12.0 | — | 15.0 | — |
| Mw[4] | 10,600 | 10,200 | 6,300 | 11,200 | 5,800 |
| Composition of monomers charged (p-VP mol. %)[5] | 61 | 62 | 62 | 100 | 100 |
| p-VP content of copolymer formed (p-VP mol. %) | 58 | 61 | 60 | 100 | 100 |
| Amount of copolymer formed (g) | 14.0 | 8.8 | 7.9 | 12.9 | 11.1 |
| Yield of copolymer (%) | 82.3 | 78.8 | 70.1 | 75.8 | 65.0 |

[1] t-butyl acrylate;
[2] methyl methacrylate
[3] azoisobutyronitrile
[4] weight average molecular weight
[5] (moles of p-VP charged/moles of total monomers charged × 100
C. Ex.: Comparative Example TABLE 1d

|  | Ex. 9 | C. Ex. 10 | Ex. 10 | C. Ex. 11 |
|---|---|---|---|---|
| p-vinylphenol (g) | 17 | 17 | 17 | 17 |
| TBA[1] (g) | 28 | 28 | 10 | 10 |
| Styrene (g) | — | — | — | — |
| MMA[2] (g) | — | — | — | — |
| AIBN[3] | | | | |
| (g) | 0.40 | 0.36 | 0.80 | 0.70 |
| (wt. %) | 0.40 | 0.40 | 1.00 | 1.00 |
| Methanol (g) | 15.0 | — | 15.0 | — |
| Mw[4] | 95,800 | 43,300 | 8,100 | 4,800 |
| Composition of monomers charged (p-VP mol. %)[5] | 32 | 32 | 64 | 64 |
| p-VP content of copolymer formed (p-VP mol. %) | 41 | 40 | 65 | 64 |
| Amount of copolymer formed (g) | 40.3 | 39.1 | 24.8 | 23.5 |
| Yield of copolymer (%) | 89.6 | 86.9 | 91.9 | 87.0 |

[1] t-butyl acrylate;
[2] methyl methacrylate
[3] azoisobutyronitrile
[4] weight average molecular weight
[5] (moles of p-VP charged/moles of total monomers charged × 100
C. Ex.: Comparative Example Table 1 shows the following facts: (1) Molecular weight of polymers can be increased by the addition of methanol in the reaction system both in the case of copolymerization and homopolymerization (comparison of the results obtained in the Examples and corresponding Comparative Examples). (2) A significant molecular weight increasing effect is given only by the use of methanol (Example 3 vs. Comparative Examples 4, 5, and Comparative Example 3 vs. Comparative Examples 4,5). (3) When a larger amount of methanol is used, copolymer having a higher molecular weight can be formed (Examples 5, 6 vs. Comparative Example 7). (4) By the addition of methanol, polymer yield is increased (comparison of examples and corresponding comparative examples). (5) In a case of copolymerization of vinylphenol (p-VP) and other vinyl compounds, e.g., TBA, molecular weight of copolymer is increased according to the decrease of p-VP/TBA ratio (Examples 1–3). Accordingly, molecular weight of vinylphenol homopolymer obtained in Example 8 is lower than those obtained in Examples 1–3, nevertheless the molecular weight obtained in Example 8 still satisfies the target molecular weight range of from eight thousand to one hundred thousand. (6) When a larger amount of radical initiator, i.e., AIBN, is used, copolymer having a lower molecular weight is formed (Example 2 vs. Example 4).

We claim:

1. A process for preparing a vinylphenol polymer or copolymer by polymerizing a vinylphenol-containing polymerization raw material or copolymerizing a vinylphenol containing polymerization raw material with at least one vinyl compound which is copolymerizable with vinylphenol by using a radical initiator, characterized in that the polymerization or copolymerization is conducted in the presence of methanol, and said polymer or copolymer has weight average molecular weight of between about eight thousand and one hundred thousand.

2. The process according to claim 1, wherein said vinylphenol-containing polymerization raw material comprises vinylphenol, non-polymerizable phenols and water.

3. The process according to claim 1, wherein said vinylphenol-containing polymerization raw material comprises vinylphenol, non-polymerizable phenols and water, and is a crude reaction product or a partially purified reaction product obtained by dehydrogenation of ethylphenol.

4. The process according to claim 1, wherein the amount of methanol comprises between about 3% and 150% by weight based on the total weight of the vinylphenol-containing polymerization raw material and said vinyl compound.

5. The process according to claim 2, wherein the amount of methanol comprises between about 3% and 150% by weight based on the total weight of the vinylphenol-containing polymerization raw material and said vinyl compound.

6. The process according to claim 3, wherein the amount of methanol comprises between about 3% and 150% by weight based on the total weight of the vinylphenol-containing polymerization raw material and said vinyl compound.

7. The process according to claim 2, wherein the amount of methanol used is to satisfy a weight ratio of (vinylphenol):(methanol):(phenolic compounds):(water) of 1:0.03–20:0.01–20:0.01–5.

8. The process according to claim 3, wherein the amount of methanol used is to satisfy a weight ratio of (vinylphenol):(methanol):(phenolic compounds):(water) of 1:0.03–20:0.01–20:0.01–5.

9. The process according to claim 1, wherein said vinylphenol-containing polymerization raw material comprises vinylphenol, non-polymerizable phenols and water, and the amount of methanol comprises between about 3% and 150% by weight based on the total weight of the vinylphenol-containing polymerization raw material and said vinyl compound.

10. The process according to claim 9, wherein said vinylphenol-containing polymerization raw material is a crude reaction product or a partially purified reaction product obtained by dehydrogenation of ethylphenol.

11. The process according to claim 9, wherein the amount of methanol used is to satisfy a weight ratio of (vinylphenol):(methanol):(phenolic compunds):(water) of 1:0.03–20:0.01–20:0.01–5.

* * * * *